United States Patent [19]
Albitre

[11] Patent Number: 5,098,113
[45] Date of Patent: Mar. 24, 1992

[54] TRAILER FOR CYCLES

[76] Inventor: Eugene E. Albitre, 3401 Aslin St., Bakersfield, Calif. 93312

[21] Appl. No.: 573,984

[22] Filed: Aug. 28, 1990

[51] Int. Cl.⁵ .............................................. B62D 63/06
[52] U.S. Cl. ................................... 280/204; 280/494; 280/78
[58] Field of Search ................. 280/204, 472, 494, 78, 280/47.3, 47.32, 292, 304.3, 304.5, 32.7; 224/30 R, 31, 32 R, 33 R, 420.3 B

[56] References Cited

U.S. PATENT DOCUMENTS

| | | | |
|---|---|---|---|
| 1,442,035 | 1/1923 | Albert | 280/472 |
| 2,826,425 | 3/1958 | Hoeper | 280/78 |
| 2,992,834 | 7/1961 | Tidwell et al. | 280/47.3 |
| 4,027,899 | 6/1977 | Hawes et al. | 280/204 |
| 4,325,564 | 4/1982 | Phipps | 280/78 |
| 4,756,541 | 7/1988 | Albitre | 280/204 |

FOREIGN PATENT DOCUMENTS

| | | | |
|---|---|---|---|
| 0867354 | 10/1941 | France | 224/32 R |
| 0884216 | 8/1943 | France | 280/204 |
| 0417046 | 1/1947 | Italy | 224/32 R |
| 0000288 | of 1910 | United Kingdom | 224/33 R |

*Primary Examiner*—Charles A. Marmor
*Assistant Examiner*—Anne Marie Boehler
*Attorney, Agent, or Firm*—Charles Berman

[57] ABSTRACT

A lightweight single wheel trailer is provided for towing behind a bicycle and including an upwardly opening wire mesh-type receptacle mounted forward of the rear wheel of the trailer. The trailer is collapsible. The receptacle is detachable from the trailer and is collapsible for economical shipping and storage. The rear portion of the trailer is detachable from the front portion and includes opposite side rearwardly projecting arms between whose rear ends the rear wheel of the trailer is journalled. The forward end of the trailer includes a hitch assembly for coupling the forward end of to the upstanding seat supporting shank of an associated bicycle.

4 Claims, 4 Drawing Sheets

TRAILER FOR CYCLES

BACKGROUND

This invention relates to a trailer specifically designed to be hitched to and trailed behind a cycle, such as a bicycle, tricycle or motorcycle, with no structural modification of the cycle required and with the trailer being of lightweight construction, yet adapted to support reasonably heavy loads. This invention incorporates by reference herein in its entirety U.S. Pat. No. 4,756,541.

Trailers for cycles are expensive to ship due to their size. The expense of shipping adds considerably to the wholesale and retail costs of the trailer. A further problem with trailers for cycles is they cannot be efficiently stored.

SUMMARY

The trailer of the instant invention solves the problems of costly shipping and bulky storage by providing a trailer that is collapsible.

The trailer of the instant invention includes a lightweight underslung main frame. The main frame includes front and rear portions. The invention further embodies the front and rear portions detachably connected to each other.

The trailer further includes a receptacle supported from the main frame. The receptacle can have bottom, rear, and side walls. The receptacle can be anchored to the main frame. In a preferred version of the invention, the receptacle is upwardly opening and can be detachably anchored to the main frame. The invention further contemplates the walls of the receptacle being collapsible into planar elements.

The front portion of the main frame has a forward element which has an end that includes hitch means for universal connection with a mounting portion of a cycle. The rear portion of the main frame includes an upright standard.

A pair of rigid, laterally spaced wheel mounting arms project rearwardly from the rear portion of the main frame. The wheel mounting arms terminate in rear ends provided with wheel mounting structures. A single rear wheel is journalled in the wheel mounting structures between the rigid, laterally spaced and rearwardly projecting wheel mounting arms.

The front portion of the main frame includes a retractable stand assembly.

The invention provides a lightweight trailer for trailing behind a bicycle or motorcycle and which will lean with the cycle when executing turns. However, the connection between the forward element of the trailer and bicycle is such that relative steering angulation between the frame of the associated bicycle and the trailer frame automatically functions to reduce leaning of the trailer during sharp turning movements of the bicycle and trailer combination. In fact, as the steering angle between the bicycle and trailer increases toward a 90° angle during a sharp leaning turn of the bicycle, the lean angle of the trailer is reduced toward zero.

The invention provides a cycle trailer that is collapsible or easily folded so as to provide a device that can be economically shipped and requires a minimum of space for storage. Toward this end, the invention provides a main frame comprised of detachable front and rear portions. Another version of the invention comprises an upward opening receptacle which is detachable from the main frame and collapsible into planar elements. The invention further comprises a main frame comprised of detachable front and rear portions and an upward opening receptacle which is detachable from the main frame and collapsible into planar elements.

The invention provides a bicycle trailer of lightweight construction, but which may support reasonably heavy loads.

The invention further provides a lightweight bicycle trailer including provisions for trailer wheel braking.

The invention provides a bicycle trailer with a retractable front stand portion.

The invention further provides a bicycle trailer including coupling structure for coupling the forward element of the trailer to a mounting portion of a cycle, such as a bicycle seat support shank, in a manner whereby the bicycle and trailer combination is gradually reduced relative to the leaning angle of the bicycle as the turning angle between the bicycle and trailer approaches 90°.

The invention provides a lightweight trailer also for use behind a motorcycle.

The invention provides a cycle trailer in accordance with the preceding objects and which will conform to conventional forms of manufacture, be of simple construction and easy to use so as to provide a device that will be economically feasible, long lasting and relatively trouble free in operation.

These, and other features, aspects, and advantages of the present invention are further explained in the following description and accompanying drawings.

DRAWINGS

DESCRIPTION

Figure 1:
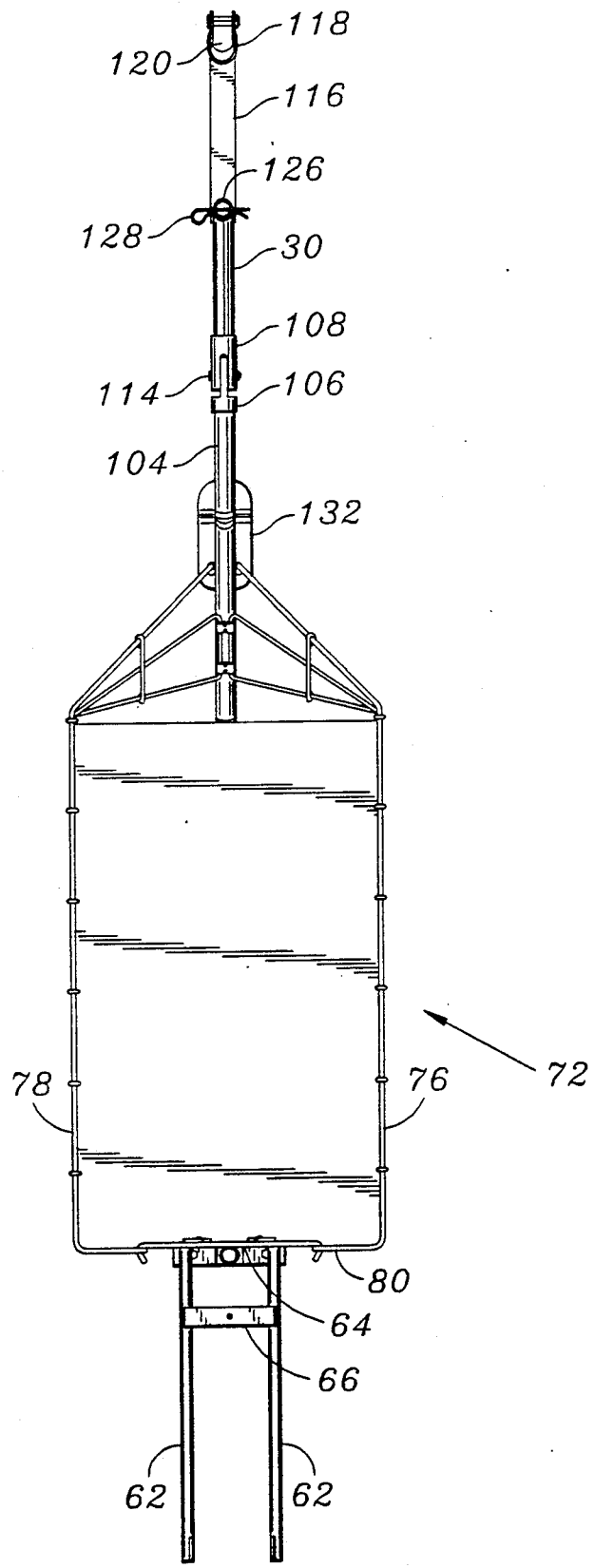
FIG. 1 is a top plan view of a trailer constructed in accordance with the present invention and with the trailer coupled to the rear end portion of a conventional form of bicycle.

Referring now more specifically to the drawings, the numeral 10 generally designates a conventional form of bicycle including a rear wheel 12, rear fender 14 disposed over the upper peripheral portion of the wheel 12 and a rearwardly and upwardly inclined seat supporting shank 16 supporting an upper end seat 15.

The trailer of the instant invention is referred to in general by the reference numeral 18 and includes an underslung, lightweight central longitudinal main frame 20. The main frame has a front portion 22 and a rear portion 24. A forward element 23 includes an end extending from the front portion 22. The end includes hitch means 30 for universal connection with a mounting portion 16 of a cycle 10.

The front 22 and rear 24 portions are detachably connected to a coupling means 26 located at the rear end 28 of the front portion 22 of the main frame 20. In a typical version of the invention, the forward element 23 is fashioned as a forward goose-neck tongue 32 and includes an upstanding lower portion 34 whose lower end is supported from the forward portion 22 of the main frame 20 and whose upper portion 36 extends forwardly from the upstanding lower portion 34 over the fender 14. The forward extremity of the upper portion 34 supports a hitch construction referred to in general by the reference numeral 30 to be more fully hereinafter set forth.

Figure 4:
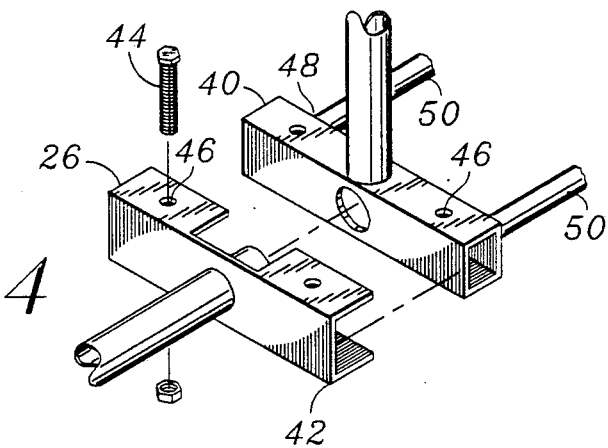
FIG. 4 is an exploded detail perspective view of the coupling means for detachably securing the rear end of the front portion to the head end of the rear portion of the main frame.
Figure 5:
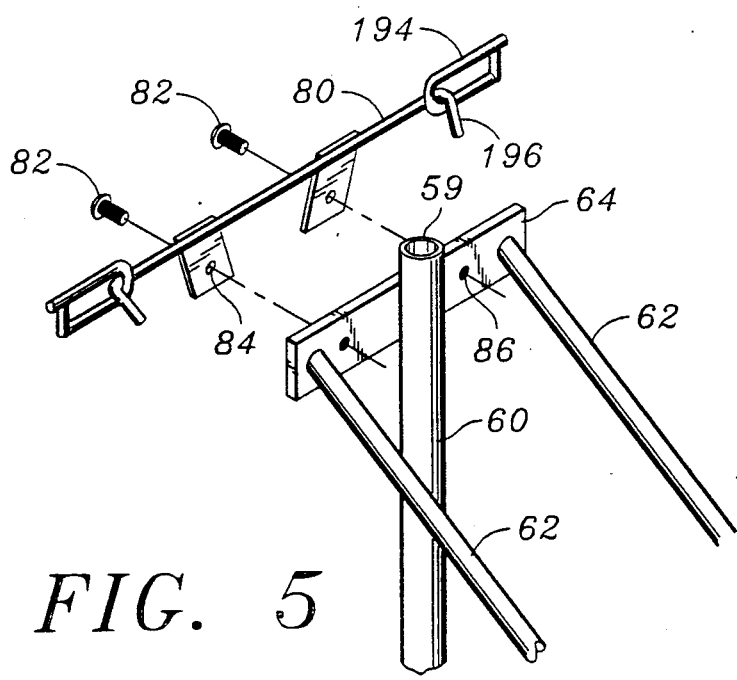
FIG. 5 is an exploded perspective of the mating of the rear wall of the upward opening load receiving receptacle with the upper end of the upright standard.
Figure 6:
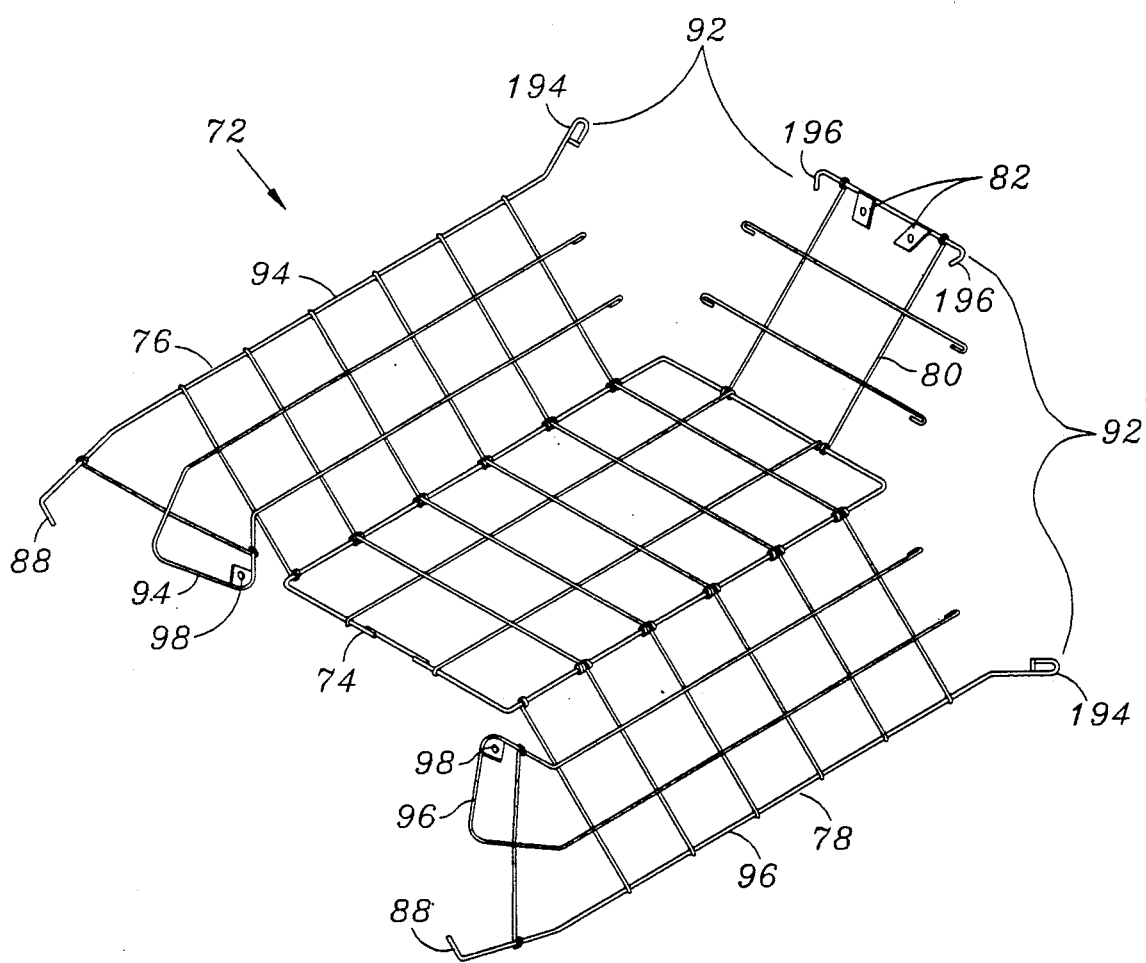
FIG. 6 is a perspective view of the upward opening load receiving receptacle unassembled and detached from the main frame showing the planar elements of the side walls, rear wall and bottom wall.

In securing the front portion 22 and rear portion 24 of the main frame 20, the invention contemplates the rear end 28 of the front portion 22 having a coupling means 26 for detachably securing the rear end 28 of the front portion 22 to the head end 38 of the rear portion 24. The head end 38 includes a transverse member 40. As shown in FIG. 4 the coupling means 26 includes a U-shaped fitting 42, the open end of the U facing rearward and slidably fitting over the transverse member 40 located at the head end 38 of the rear portion 24 of the main frame 20. The front portion 22 and rear portion 24 of the main frame 20 are detachably secured to each other by bolts 44 placed in laterally spaced holes 46 drilled vertically through the U-shaped fitting 42 and the transverse member 40 of the rear portion 24. The detachable coupling means 26 transfers twisting action stress from the bolts 44 to the surfaces which bear the stress of the contact between the U-shaped fitting 42 and the transverse member. In operation, removing the bolts 44 from the holes 46 allows the front portion 22 and rear portion 24 of the main frame 20 to be detached from each other.

The head end 38 of the rear portion 24 of the main frame 20 includes a transverse member 40 and the front ends 48 of a pair of opposite side longitudinally extending wheel support arms 50 which are secured to opposite ends of the transverse member 40 and project rearwardly therefrom, each terminating rearwardly in a rear end 52. The rear ends 52 of the wheel support arms 50 include upstanding mounts 54 between whose upper ends a rear wheel assembly referred to in general by the reference numeral 56 is journalled.

The lower end 58 of an upright standard 60 is anchored relative to the transverse member 40 of the rear portion 24 of the main frame 20. Typically, the invention employs a pair of opposite side, rearwardly and downwardly inclined elongated braces 62 which extend and are anchored between a plate 64 located on the front surface of the upper end 59 of the upright standard 60 and the corresponding upstanding mounts 54. In addition, a mounting plate 66 extends and is secured between the upper ends of the braces 62 and supports a caliper-type brake assembly 68 in operative association with the rim 70 of the wheel assembly 56. The brake assembly 68 may be cable actuated by a conventional form of actuating cable (not shown) and brake actuating lever (not shown) supported at a convenient location on the bicycle 10.

The main frame 20 detachably supports an upwardly opening receptacle referred to in general by the reference numeral 72 including a bottom wall 74 overlying and supported from the main frame 20. The walls 74, 76, 78, 80 of the receptacle can be collapsed by disconnecting them from each other. Detachably anchoring the receptacle 72 is accomplished in part by placing bolts 82 through mating holes 84, 86 located respectively on the upper margin of the rear wall and the plate 64 attached to the forward surface of the upright standard 60. Further anchoring of the receptacle 72 to the main frame is achieved by placing bolts through mating holes 98 located respectively on the forward marginal side walls to dye-tapped holes drilled in the upstanding portion of the goose neck 34 of the main frame. Further detachable anchoring of the receptacle to the main frame is achieved by inserting an angular length of metal 88 provided on the forward upper margin of each side wall 76, 78 into a receptacle 90, such as a vertically oriented tube, provided on each side of the forward upstanding goose neck portion 36 of the main frame 20.

The trailer 72 comprises the front portion 22 and rear portion 24 being collapsible and the receptacle 72 being collapsible into planar elements 74, 76, 78, 80 as well as being detachably anchored to the main frame 20. In operation, the main frame 20 is assembled by first securing the front portion 22 of the main frame 20 to the rear portion 24 by sliding the U-shaped fitting 42 into position over the transverse member 40 and inserting bolts 44. The receptacle 72 is then assembled. The side walls 76, 78 and rear wall 80 of the receptacle 72 are unfolded, pivoted upwards, and connected to each other by fastening of the respective connecting means 92 to each other. The connecting means are typically eyes 94 and hooks 96 fashioned from the wire of the receptacle. After the angular lengths 88 of the assembled receptacle 72 are positioned over the vertical tubes 90 on the main frame 20, the assembled receptacle 72 is lowered so that the angular lengths 88 are inserted into the vertical tubes 90. The assembled receptacle 72 is then anchored to the main frame 20 by placing bolts 82 in the mating holes 84, 86.

In a typical version of the invention, the receptacle 72 includes heavy wire mesh opposite side walls 76, 78 as well as a heavy wire mesh rear wall 80 and bottom wall 74. The walls 76, 78, 80 typically include double upper marginal wire members whereby the upper margins of the walls 76, 78, 80 are reinforced. In a more preferred version of the invention, at least the upper marginal portion of the rear wall 80 is detachably anchored relative to the upper end portion of the standard 60. Mating holes 84 on the upper margin of the rear wall 80 can be bolted to corresponding holes drilled in a plate 64 located on the front surface of the upper part of the upright standard.

The forward mid-height and upper margins of the side walls 76, 78 are defined by the corresponding wire members 94, 96. The forward mid-height margins of the side walls 76, 78 are detachably anchored relative to mid-height portions of the goose-neck tongue 34. In a preferred version of the invention, mating holes 98 on the forward, mid-height margin of the side walls 76, 78 are bolted to dye tapped holes on the mid-height portion of the goose neck portion 32 of the main frame 20. The forward upper margin of the side walls includes angular lengths of wire 88 which are inserted into vertical tubes 90 provided on the main frame 20 for detachably anchoring the receptacle 72 to the main frame 20. The upper marginal portions of the walls 76, 78, 80 define reinforcement between the upper portion of the standard 60 and the mid-height portion of the gooseneck 34.

In operation, the receptacle 72 can be detached from the main frame 20 by removing the bolts 82 connecting the mating holes 84 located on an upper marginal portion of the rear wall 80 to the plate 64 located on the front surface of the upright standard 60 and the bolts connecting the mating holes 98 on the forward, mid-height margins of the side walls to the dye-tapped holes in the mid-height region of the goose neck portion 32 of the main frame 20. After removing the bolts, the receptacle 72 can be lifted so that the angular length of wire 88 located on the front margin of the basket are removed from the vertical tubes 90 of the upper portion of the goose neck 36.

For storage and or shipping, typically the receptacle 72 is detached from the main frame 20 as described above. The eyes 94 and hooks 96 interconnecting the side walls 76, 78 to the rear wall 80 disconnected. One side wall 76 or 78 of the receptacle 72 can be folded over to the top side or the bottom side of the bottom wall 74, the other side wall is then folded to the other side of the bottom wall 74 of the receptacle 72, and the rear wall 80 folded to the top side of the bottom wall 74.

The trailer typically comprises a mount 100 dependingly supported from the forward portion 22 end of the main frame 20 and pivotally supporting an upwardly retractable inverted U-shaped stand 102 therefrom through the utilization of a pivot fastener. The stand 102 may be either frictionally retained in adjusted rotated positions or lightly spring biased toward an upwardly swung horizontal position immediately underlying the main frame 20 through any convenient form of spring means (not shown).

Figure 2:
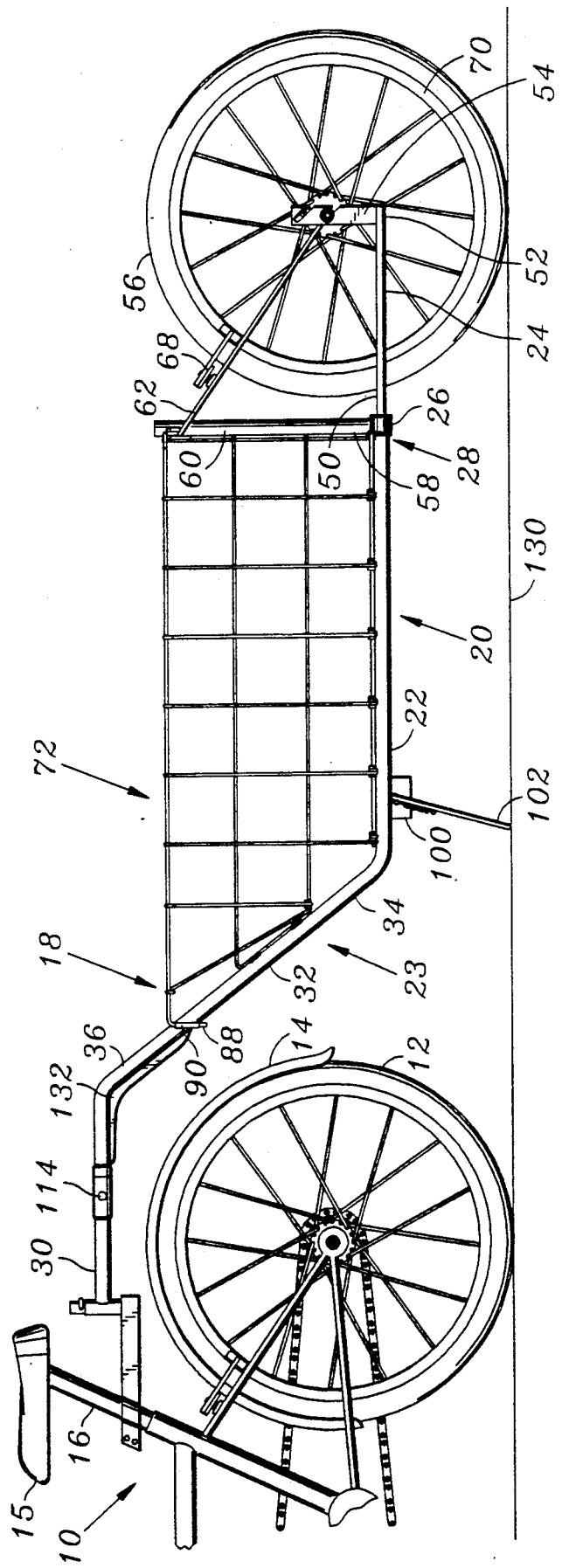
FIG. 2 is a side elevational view of the assemblage illustrated in FIG. 1 with the support stand of the trailer in a lowered position so as to support both the trailer and the associated bicycle in an upright position.
Figure 3:
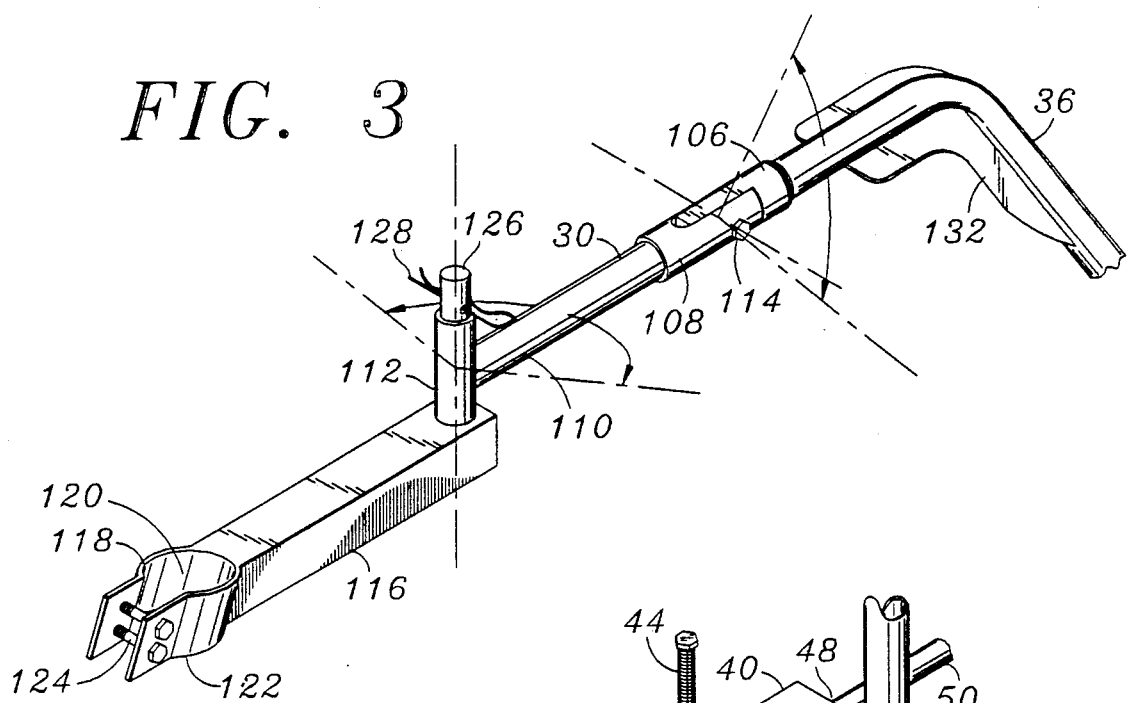
FIG. 3 is a fragmentary perspective view of the forward element illustrating the coupling structure by which the forward element of the trailer is coupled to the seat supporting shank of a bicycle.

With attention now invited more specifically to FIGS. 1, 2 and 3 of the drawings, it may be seen that a typical version of the invention contemplates the forward element 23 being tubular and shaped like a goose neck, and having a diametrically reduced shank portion 106 of a bifurcated fitting 108 secured therein. In addition, a T-shaped fitting 110 is provided and includes a vertical tubular cross-head 112 and a horizontally rearwardly projecting shank terminating rearwardly in a transversely reduced portion pivotally secured between the furcations of the fitting 108 by a pivot pin 114.

In this version where the forward element 23 is shaped like a goose neck, the upper portion 36 of the goose neck includes a stabilizing fin 132. The fin 132 is welded to the lateral surfaces of the goose neck and spans the area from the upper portion 36 of the goose neck to a bifurcated fitting 108. The stabilizing fin 132 increases the strength of the main frame 20 in fast-turning situations.

A tubular front-to-rear extending support arm 116 is provided and formed at its forward end into a fitting 118 with a vertically oriented bore for snugly receiving the seat 15 supporting shank 16 of the cycle 10. Formed in the upper and lower walls of the support arm 116, the bore in the upper wall is displaced slightly rearward of the location of the bore in the bottom wall. The bores snugly receive the seat supporting shank 16 of the bicycle 10 therethrough and a clamp-type fastener 122, is secured through transversely registered bores 124 formed in the opposite side walls of the support arm forward of the vertically oriented bore 120. Thus, the fitting 118 functions as a clamp-type fastener to securely clamp the forward end of the support arm 116 to the seat support shank 16.

The rear end of the support arm 116 supports an upwardly projecting shank therefrom and the tubular cross head 112 is slidingly and rotatably mounted on a shank below a removable retaining pin 128 secured through a transverse bore formed in the shank 126.

In operation, once the support arm 116 has been mounted on the seat support shank 16, assuming that the trailer 18 is supported from the support surface 130 therefor by the stand 102, it is merely necessary to back the bicycle 10 beneath the upper portion of the goose neck 36 and to remove the pin 128. Thereafter, the hitch construction 30 may be grasped in order to slip the cross-head 112 downwardly over the shank 106. Thereafter the pin 128 may be replaced and the stand 102 may be retracted.

Because of the unique manner in which the receptacle 72 braces the upper end of the standard 59 relative to the mid-height portion of the goose neck portion 32, a considerable load may be carried in the receptacle 72, even though the trailer 18 is of lightweight construction. In addition, because of the specific structural features of the hitch construction 30, even though the bicycle 10 may be leaned excessively relative to the surface 130 during a sharp turn, the amount the trailer 18 is leaned relative to the surface 130 will be gradually reduced as the turning angle between the bicycle and trailer is increased toward 90°.

If the trailer 18 is to be used in conjunction with a motorcycle including a rear hitch portion equipped with an upstanding shank such as the shank 126, the trailer 18 is constructed with a forwardly projecting goose neck portion including a forward end such as the forward end 104 and in which a diametrically reduced shank portion such as that indicated at 106 is secured. In addition, the components 126, 110, 112, 108, 114 also will be used with the component or tubular cross-head of the motorcycle trailer corresponding to the cross-head 112 being downwardly telescoped over and rotatable on the aforementioned upwardly projecting shank corresponding tot he shank 126 carried by the motorcycle.

The foregoing is considered as illustrative only of the principles of the invention. Further, since numerous modifications and changes will readily occur to those skilled in the art, it is not desired to limit the invention to the exact construction and operation shown and described. Other versions are possible. For example, the forward element may extend to a mounting portion other than the shank supporting a bicycle seat. This feature need not be limited to elements which are upstanding and extending to the seat shank. For example, the forward element may extend in the same plane as the front and rear portions to mounting portions on the rear wheel assembly of the bicycle. The forward element may comprise a portion that is upstanding to mount with the seat shank and a lower portion to mount with the bicycle rear wheel assembly.

The collapsibility of the main frame may be achieved in alternative fashion. For example, the relative detachability of the front and rear portions of the main frame may be achieved by providing coupling means in the vicinity of the forward elements instead of providing coupling means closer to the wheel assembly of the trailer. It is also possible to achieve collapsibility of the main frame by providing a plurality of coupling means along the main frame. Another alternative involving the collapsibilty of the main frame.

With regard to detachably anchoring the upward loading receptacle to the main frame, alternative locations for mating holes between the receptacle and the main frame can be provided. Another alternative for detachably anchoring the receptacle can employ lock-and-key mechanisms for securely attaching the receptacle to the main frame, preventing theft of the receptacle when the trailer is unattended in a public area.

The receptacle itself it not limited to an upwardly opening receptacle. The receptacle can open sideways. Furthermore, the receptacle may have a lid or hatch for securing the contents of the load being carried. Moreover, the walls of the receptable can be comprised of solid planar elements fabricated materials such as, but not limited to, metal, fiber glass, or plastic.

Other versions of the main frame are possible. The main frame may comprise a plurality of parallel horizontal frames.

It should be understood that the above list of alternative versions of the invention is not intended to be exclusive. Accordingly, the spirit and scope of the appended claims should not be limited to the description of the preferred version contained herein.

What is claimed is:

1. A trailer for use behind a cycle including a lower horizontal main frame having a front portion and a rear portion and a forward element including an end extending from the front portion, the end including hitch means for universal connection with a mounting portion of a cycle and with the end extending rearwardly from the mounting portion of the cycle, an upright standard having an upper end and a lower end mounted with the rear portion of the main frame, an openable load receiving receptacle including a bottom wall supported from and extending along the main frame, upstanding side walls extending upward from opposite longitudinal margins of the bottom wall, and a rear wall interconnecting with and extending upward from a rear margin of the bottom wall, the side walls and rear wall including interconnected upper marginal portions, the rear portion including a pair of front-to-rear extending opposite side and laterally spaced apart wheel support arms provided with wheel mounting structures, a rear wheel disposed between the arms and journalled from the wheel mounting structures, and wherein the front portion and the rear portion of the main frame are selectively relatively detachable wherein the load receiving receptacle has side walls hingedly connected to opposite longitudinal margins of the bottom wall and a rear wall hingedly connected to a rear margin of the bottom wall such that the side walls can be pivoted to extend upward from opposite longitudinal margins of the bottom walls and the rear wall can be pivoted to extend upward from the rear margin of the bottom wall, the side walls including forward and rearward marginal portions, the rearward marginal portions having connecting means for detachably connecting the rearward marginal portions of the side walls to connecting means positioned on lateral marginal portions of the rear wall, the side nd rear walls including interconnected upper marginal portions, at least the central portion of the upper marginal portion of the rear wall being detachably anchored to the upright standard located on the rear portion of the main frame, at least the forward marginal portions of the side wall being detachably anchored to the front portion of the main frame.

2. A trailer for use behind a cycle including a lower horizontal main frame having a front portion and a rear portion and a forward element including an end extending from the front portion, the end including hitch means for universal connecting with a mounting portion of a cycle and with the end extending rearwardly from the mounting portion of the cycle, an upright standard having an upper end and a lower end mounted with the rear portion of the main frame, an openable load receiving receptacle including a bottom wall supported from and extending along the main frame, upstanding side walls extending upward from opposite longitudinal margins of the bottom wall, and a rear wall extending upward from a rear margin of the bottom wall, the side walls and rear wall including interconnected upper marginal portions, a pair of front-to-rear extending opposite side and laterally spaced apart wheel support arms including rear ends provided with wheel mounting structures, a rear wheel disposed between the arms and journalled from the wheel mounted structures, and wherein the load receiving receptacle is selectively collapsible into planar elements and detachably anchored to the main frame, the side walls being hingedly connected with the bottom wall wherein the load receiving receptacle has side walls hingedly connected to opposite longitudinal margins of the bottom wall and a rear wall hingedly connected to a rear margin of the bottom wall such that the side walls can be pivoted to extend upward from opposite longitudinal margins of the bottom walls and the rear wall can be pivoted to extend upward from the rear margin of the bottom wall, the side walls including forward the rearward marginal portions, the rearward marginal portions having connecting means for detachably connecting the rearward marginal portions of the side walls to connecting means positioned on lateral marginal portions of the rear wall, the side and rear walls including interconnected upper marginal portions, at least the central portion of the upper marginal portion of the rear wall being detachably anchored to the upright standard located on the rear portion of the main frame, at least the forward marginal portions of the side wall being detachably anchored to the front portion of the main frame.

3. The trailer as claimed in claim 2 wherein the front element includes a stabilizing fin.

4. A trailer for use behind a cycle including a lower horizontal main frame having a front portion and a rear portion and a forward element including an end extending from the front portion, the end including hitch means for universal connection with a mounting portion of a cycle and with the end extending rearwardly from the mounting portion of the cycle, an upright standard having an upper end and a lower end mounted with the rear portion of the main frame, an operable load receiving receptacle including a bottom wall supported from and extending along the main frame, upstanding side walls extending upward from opposite longitudinal margins of the bottom wall, and a rear wall extending upward from a rear margin of the bottom wall, the side walls and rear wall including interconnected upper marginal portion, a pair of front-to-rear extending opposite side and laterally spaced apart wheel support arms including rear ends provided with wheel mounting structures, a rear wheel disposed between the arms and journalled from the wheel mounting structures, and wherein the front portion and the rear portion of the main frame are selectively relatively detachable, and wherein the load receiving receptacle is collapsible into planar elements and detachably anchored to the main frames wherein the load receiving receptacle has side walls hingedly connected to opposite longitudinal margins of the bottom wall and a rear wall hingedly connected to a rear margin of the bottom wall such that the side walls can be pivoted to extend upward from the opposite longitudinal margins of the bottom walls and the rear wall can be pivoted to extend upward from the rear margin of the bottom wall, the side walls including forward and rearward marginal portions, the rearward marginal portions having connecting means for detachably connecting the rearward marginal portions of the side walls to connecting means positioned on lateral marginal portions of the rear wall, the side and rear walls including interconnected upper marginal portions, at least the central portion of the upper marginal portion of the rear wall being detachably anchored to the upright standard located on the rear portion of the main frame, at least the forward marginal portions of the side wall being detachably anchored to the front portion of the main frame.

* * * * *